United States Patent [19]
Rubin et al.
[11] 3,825,947
[45] July 23, 1974

[54] METHOD AND MEANS FOR GIVING POINT OF SALE COMMERCIAL ANNOUNCEMENTS

[75] Inventors: Jerome Rubin, Englewood Cliffs, N.J.; Avery Lockner, Garnerville, N.Y.

[73] Assignees: Jerome Rubin, Englewood Cliffs, N.J.; Michael H. Davis, Oak Brook, Ill.

[22] Filed: Feb. 16, 1973

[21] Appl. No.: 333,283

[52] U.S. Cl. ............... 360/12, 179/100.1 C, 360/60
[51] Int. Cl. ....................... G11b 15/02, G11b 15/06
[58] Field of Search ............ 179/100.1 C, 100.1 PS, 179/100.2 MD, 100.2 Z, 100.2 S; 274/4 B, 4 C

[56] References Cited

UNITED STATES PATENTS

| | | | |
|---|---|---|---|
| 2,068,106 | 1/1937 | Horn et al. | 179/100.1 C |
| 2,960,577 | 11/1960 | Pray | 179/100.1 C |
| 2,995,630 | 8/1961 | Kabrick | 179/100.1 PS |
| 3,059,063 | 10/1962 | Bailey et al. | 179/100.2 S |
| 3,147,346 | 9/1964 | Herman | 179/100.1 C |
| 3,291,919 | 12/1966 | Robitaille | 179/100.2 S |
| 3,376,564 | 4/1968 | Holland | 179/100.2 S |
| 3,493,681 | 2/1970 | Richards | 179/100.1 C |
| 3,601,553 | 8/1971 | Cooper | 179/100.2 S |
| 3,650,378 | 3/1972 | Kabiuchi et al. | 179/100.2 Z |

*Primary Examiner*—Bernard Konick
*Assistant Examiner*—Stewart Levy
*Attorney, Agent, or Firm*—Alter, Weiss, Whitesel & Laff

[57] ABSTRACT

Point of sales advertisements are given by a tape recorder which periodically plays back prerecorded commercial announcements. In one embodiment, a tape recorder turns on and interrupts background program material. An interlock on the tape player prevents the playing of any unauthorized cassette or cartridge.

17 Claims, 6 Drawing Figures

METHOD AND MEANS FOR GIVING POINT OF SALE COMMERCIAL ANNOUNCEMENTS

This invention relates to specialized tape players and, more particularly, to cartridge or cassette tape players for automatically playing back prerecorded commercial announcements at a point of sales.

Tape recorders have developed into low cost, reliable, easily used devices which may playback any of a great variety of prerecorded programs. Simultaneously, many other sources of good program material have also become available, such as FM radio, one to four channel phonograph systems, television, and the like. As a result, many public and semi-public places play music or show television (hereinafter collectively called "background programs") for the benefit of their customers or patrons. These background programs have become quite professional in their performance and presentation.

Usually, local advertisements that are made in the same places are very primitive. A local manager of a salesman merely pushes a button and makes a commercial announcement concerning a sale, whenever he feels so inclined. The announcer usually has little or no training in advertising, use of his voice, or the like. Therefore, the point of sale advertisement is often ineffective.

More effective point-of-sale advertising can be achieved by professionally recorded commercials. The difficulty, however, is that most retail or other public or semi-public locations do not have tape cartridge or cassette playback equipment. Thus, for an advertiser to have his commercials played at such locations, he must provide the playback equipment. The professional advertiser will not wish to install such equipment if he cannot be assured that his commercials are played on it. Moreover, the retail outlet or other public or semi-public location will not wish to install the equipment if it is not compatible with other sound equipment that it has on location, such as an FM radio music source.

Accordingly, an object of the invention is to provide new and improved point-of-sale advertising using a tape recorder which can be used to interrupt a FM radio music source or other background program material. Another object is to provide a point-of-sale advertising system which employs an automatic timer for starting the playback. A further object is to provide a point-of-sale advertising system in which the playback of a selected tape or class of tapes is assured and both accidental and intentional playback of unwanted or improper tapes is precluded. A more specific object is the provision in the system of an interlock means to prevent unauthorized tapes from being played back over public announcement channels.

Another object of the invention is to provide a plurality of different types of interlocks having graduated complexity whereby an interlock may be accomplished with different degrees of cost and security. In keeping with this aspect of the invention, these and other objects are accomplished by providing either or both mechanical or electrical interlocks. In the simplest form, a mechanical interlock on a tape player may prevent the insertion of an unauthorized cassette or cartridge. From this point of departure, the invention offers progressively more complex coded combinations of key-like mechanical interfits. Specialized electrical contacts may be added to the combination. Also, various electrical control signals may be recorded on the tape for decoding at the time of playback. The term "interlock" as used herein means any one or more of the above described or similar devices. This term is used to distinguish from conventional machines where the parts are interlocked only because they fit together.

The nature of the system, equipment and devices for accomplishing the foregoing objects and other objects of the invention may be understood best from a study of the following disclosure in connection with the accompanying drawings, wherein.

Figure 1:
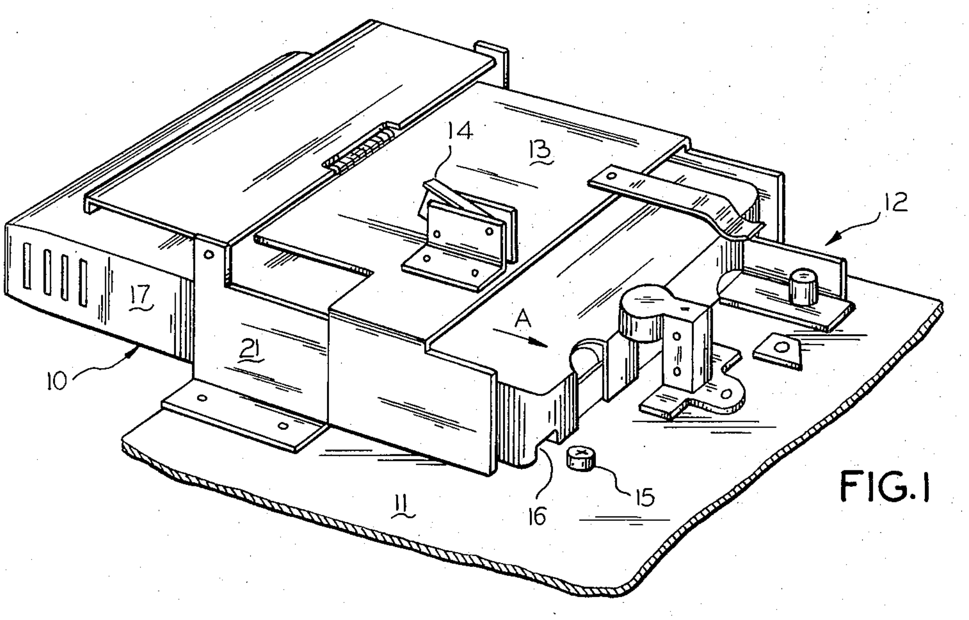
FIG. 1 is a fragmentary perspective view of a cartridge player and cartridge having a very simple form of mechanical interlock.

FIG. 1 shows a more or less conventional type cartridge 10 and tape player 11 having the usual capstan, playback head, and other parts 12. As here shown, a mechanical channel or sleeve 13 is dimensioned to slidingly receive the cartridge 10 with enough mechanical play for easy insertion and with a sufficiently tight fit to insure proper mechanical alignment between the cartridge and tape player.

To prevent the tape player 11 of FIG. 1 from playing back virtually any conventional cartridge, a mechanical interference means 15 is positioned on the tape player deck and a mating notch is formed in the abutting cartridge wall. As here shown, the interference means 15 is a Filister head, preferably self-tapping, screw driven into a hole drilled in the tape player deck 11. The abutting corner of the cartridge 10 is recessed at 16 to enable the cartridge to slip in direction A into playing position despite the presence of head 15. Since normal cartridges do not have the recess 16, they cannot be positioned far enough in direction A to rest against the playing head.

Figures 2, 3:
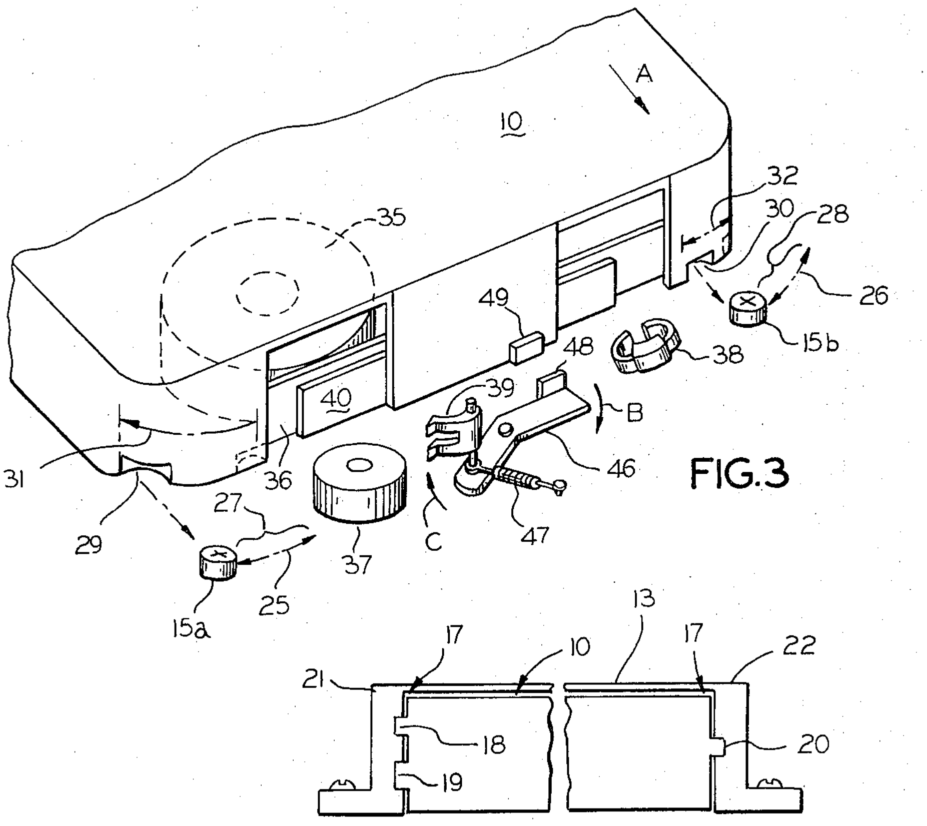
FIG. 2 is a front elevational view which shows alternative mechanical interlocking members.
FIG. 3 is a perspective, fragmentary view which shows the front of a cartridge and a more complex interlocking embodiment having both mechanical and electrical switch interlocking equipment.

FIG. 2 shows that alternative mechanical keying may be provided at other positions on the cartridge. As here shown, by way of example only, either or both of the vertical sides 17 of the cartridge walls have one or more longitudinal ribs 18–20 positioned at selected heights to enable or restrict insertion of the cartridge. The vertical guides 21, 22 adjacent the cartridge side walls have mating slots or contours which accept or reject the ribs. As illustrated at 18, 19, the ribs may have different widths. Thus, the cartridge walls may be given any suitable, unique, key-like encoding which must be met in the mating guides before the cartridge may be slipped into the tape player channel 13.

FIG. 3 shows the principle that both specialized mechanical and electrical interlocks may be provided. Here, there are two interference means in the form of Filister head screws 15*a*, 15*b*. Each screw is positioned on the tape player deck at a position which may vary over the ranges 27, 28. Adjacent the selected screen position, a recess 29, 30 is formed in the cartridge wall. Since the screw positions may vary over the ranges 27, 28, the recesses may vary over the position rnages 31, 32. Thus, it should be apparent that many differently encoded positions may be provided. One position **15*a* might provide a manufacturer or user interlock and the other a program interlock. Thus, all cartridges owned by one company might have a notch at position 29. All cartridges suitable for beauty parlors might have a notch at position 30.**

This embodiment also includes an electrical contact means which serves as an interlock with the tape itself. As is well known, the cartridge 10 includes a pinch wheel 35 which holds magnetic tape 36 against capstan 37 with a predetermined pressure so that the tapes will be moved in front of a recording or reproducing head 38. As is also well known, the magnetic tape may have an electrically conductive layer 40 attached thereto for marking the beginning or end of a recorded message. One or a pair of contacts 39 may then rub over the surface of the tape 36 and conductive metal 40. When the contacts 39 engage the conductive layer 40, the tape player performs a function which is appropriate to either the beginning or end of a recorded message. Thus, a typical sequence is for the tape player to stop when it comes to a conductive segment 40, thereby indicating the end of a message. When the next playback sequence begins, it begins from the conductive segment. Hence, it is usually necessary for the player to sense the conductive material both before and after each playback.

According to the invention, feeler contact 39 is mounted on a pivoted arm 46 normally biased to a position away from the tape 36 by the tension of a suitable spring 47. For electrical reliability, the contact 39 preferably has twin wiping surfaces. Arm 46 has a tab 48 positioned adjacent an actuator surface 49 on the face of the cartridge 10. When the cartridge 10 is pushed in direction A into an operative position, the face of actuator 49 pushing against tab 48 causes the arm 46 to rotate in the directions B, C. Thus, if the actuator surface 49 is not present on the cartridge, nothing presses against the tab 48, the arm 46 does not rotate, and no contacts are closed between foil 40 and contacts 39.

When the interlock actuator 49 is present on the cartridge 10, the arm 46 rotates under the urging of the actuator and wiping contacts 39 are pressed against the tape 36 and the pinch roller 35 with a contact pressure fixed by spring 47 and the flexibility in contacts 39. If the conductive segment 40 is present, an electrical circuit is completed from contacts 39 through conductive segment 40 to a contact (not shown) inside the cartridge. Here then the completion of the electrical circuit depends upon unique electrical contacts cooperating with the tape through the walls of the cartridge. Preferably, the circuit so controlled is energized at low current and voltage levels to avoid arcing and pitting.

Figure 4:
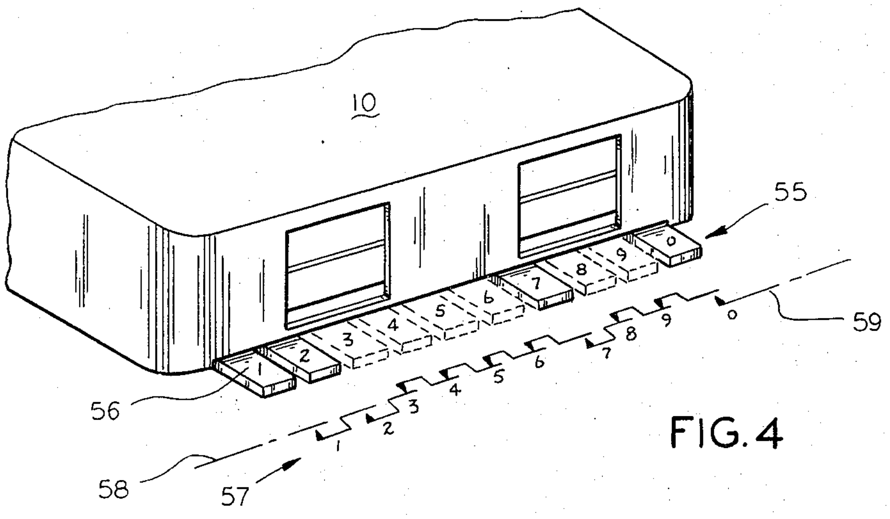
FIG. 4 is a perspective view of still another embodiment of a cartridge having a mechanical interlocking device with a selectable code.

In the embodiment of FIG. 4, the cartridge includes mechanical elements 55 which may be cut or broken away in any coded combination selected by the user. In greater detail, the drawing shows that the cartridge was originally molded from plastic or otherwise fabricated with ten teeth 56 projecting therefrom. As here shown, the user has seen fit to retain the teeth in the 1, 2, 7, and 0 position and to cut away the remainder of the teeth (as indicated by dotted lines).

A series 57 of electrical contacts are positioned in front of the teeth to form a simple AND gate which must be operated by the correct combination of teeth. The contacts 1, 2, 7, and 0 opposite the retained teeth are make contacts which are closed by the corresponding retained teeth. The contacts 3, 4, 5, 6, 8, and 9 opposite the cutaway teeth are break contacts which do not open unless a corresponding tooth is present. Hence, it should be apparent that there is continuity from wire 58 to wire 59 only if the properly encoded number of teeth are present. For example, if the "1" tooth is missing, the "1" contact is not closed; or, if the "4" tooth is present, the "4" contact is opened.

Figure 5:
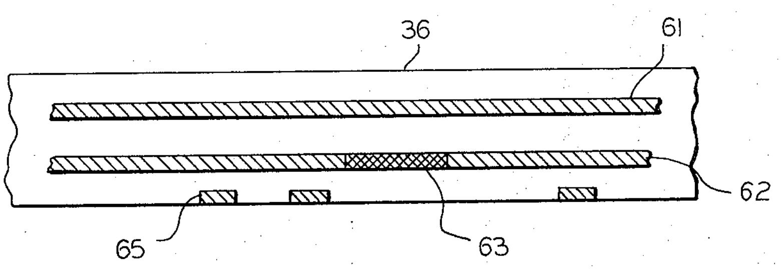
FIG. 5 shows a tape fragment having control signals recorded thereon.

Yet another method of interlock is shown in the embodiment of FIG. 5. Here, a section of magnetic tape 36 is shown as having two recorded tracks 61, 62, such as the well-known two tracks of a stereo recording. Since the recorded advertisements may be recorded on only one track 61, control signals may be recorded on the other track 62, preferably in the form of one or more tones, as at 63, for example. If cost justifications are present to require even greater security, the tones of the well-known "Touch Tone" telephone dial may be used so that commercially available filters may be used, or any other suitable encoding may be used. These tones may also be encoded in well-known manners for further security.

In the alternative, or in addition, a special track 65 of control signals may be recorded along an edge of the tape 36. These signals may also be encoded according to user's need.

Thus, the interlock between cartridge and tape player may range from a simple mechanical interference means (as in FIG. 1) through complex mechanical keying (as in FIG. 2), or it may range from simple electrical contacts through special purpose contacts (as in FIG. 3), with or without encoding (as in FIG. 4). Further, the tape itself may carry either electrical or recorded interlocking signals. These various interlocking techniques may be combined with any precision and security which may be justified by cost and user's needs. Also, the tape player may be designed to have unique playback characteristics, such as non-standard playback speeds, a reverse direction of tape transport, or unusual forms of signal modulation. Accordingly, it should be apparent that the system may be made as secure as warranted by cost considerations.

Figure 6:
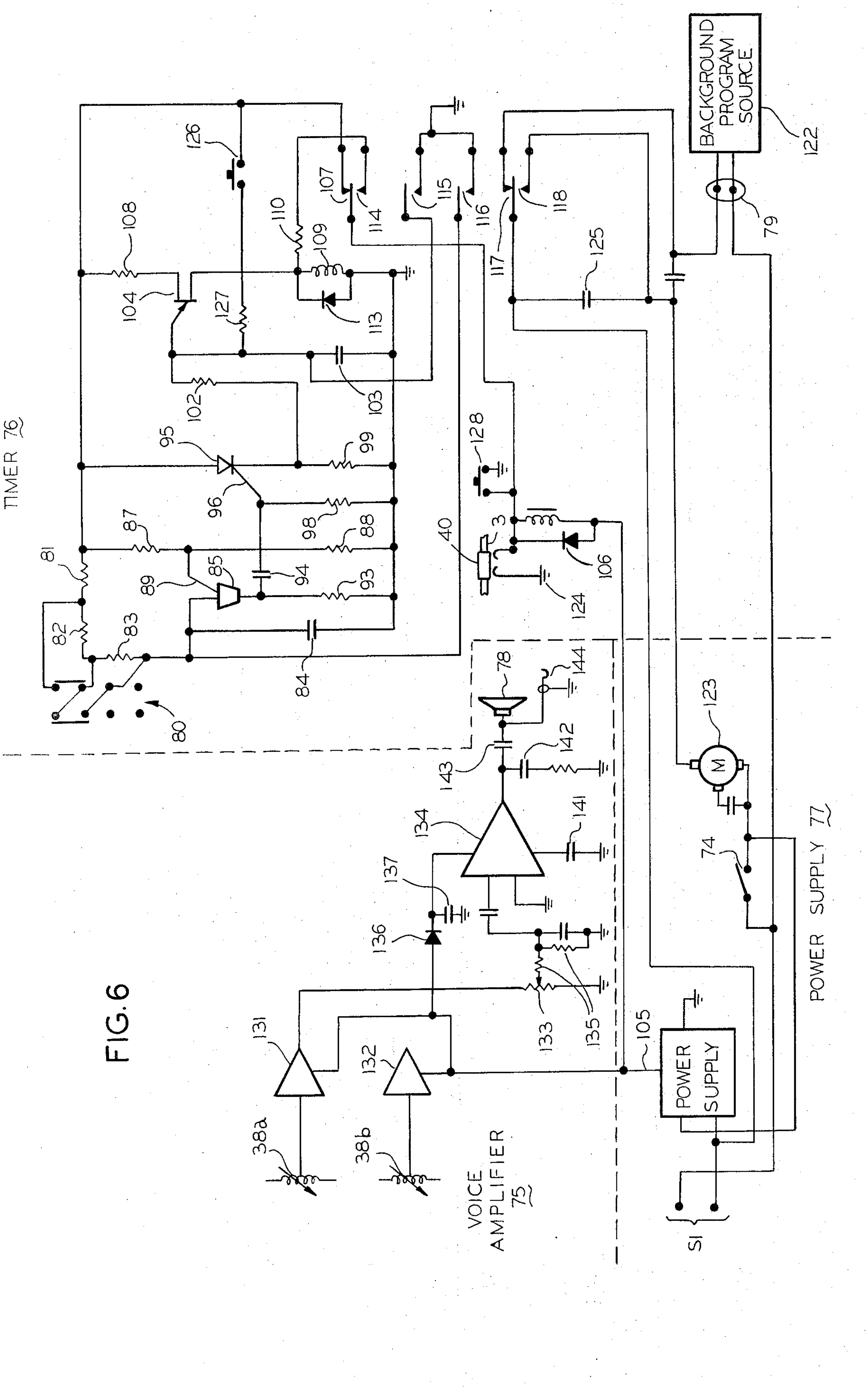
FIG. 6 is a schematic circuit diagram showing the electrical parts of a preferred embodiment of the invention.

A circuit for use in the tape player is shown by the schematic circuit diagram of FIG. 6. The major subassemblies in this drawing are a voice amplifier 75, a timer 76, and a power supply 77. The tape player feeds the voice amplifier 75 leading to the loudspeaker 78. The timer 76 periodically interrupts a source of background programs connected to jack 79 to cause the recorded announcement to be played back. The power supply 77 is plugged into a commercial power source S1. Thereafter, the timer 76 controls the power supply to cause it to energize either the voice amplifier 75 or the background program source connected to jack 79. A microswitch contact 74 is mechanically closed when the cartridge is in place in the tape player. It could also represent any of the interlock contacts of FIGS. 3 or 4.

The timer 76 comprises a three-position sliding switch 80 which selectively adds resistors 81–83 to a circuit including capacitor 84 for varying a time constant used to measure intervals between background program interruption. In one embodiment, each resistor adds fifteen minutes to the measured time. Therefore, depending upon the position of switch 80, the interrupt timing will be 15, 30, or 45 minutes.

Electronic device 85 is a programmable unijunction transistor (PUT), a device combining the functions of a silicon-controlled rectifier (SCR) and a unijunction transistor. Resistors 87, 88 are a voltage divider for biasing the gate electrode 89 of the PUT 85. When the charge on capacitor 84 reaches a threshold voltage as compared to the bias potential on gate electrode 89, the PUT 85 turns on. Thus, depending upon the positioning of switch 80, the PUT 85 will turn on every 15, 30, or 45 minutes. After the PUT 85 turns on, it remains on until the holding voltage is removed from the circuit at the end of a playback.

Responsive to current through the PUT 85, battery is applied at a potential fixed by resistor 93 through a capacitor 94 to the gate electrode 96 of an SCR 95. Resistor 98 is a load for the SCR gate electrode 96. The SCR turns on and is held on by current through it and resistor 99.

After a period of time set by the RC time constant, current through resistor 102 charges capacitor 103 to a voltage which turns on the unijunction transistor (UJT) 104. A circuit is now completed from conductor 105 in the power supply 77, through the diode 106, contacts 107, a bias resistor 108, the UJT 104, and the winding 109 of a relay to ground. Diode 113 prevents a reverse EMF in the winding 109 which could damage the UJT 104.

Responsive to the operation of the relay 109, contacts 107 open and contacts 114 close to supply holding current through relay 109 via resistor 110. Contacts 115 close to discharge the capacitor 103. Contacts 116 close to discharge the capacitor 84. All of the timers have now returned to normal. Contacts 117 open to disconnect the background program source, such as FM radio 122, which may include its own audio system having one or more loudspeakers. The program source 122 is connected to the power supply 77 at jack 79. The contacts 118 close to connect the power supply 77 to motor 123 of the tape player transport mechanism.

Hence, the tape player plays as long as relay 109 is operated. The relay remains operated until the end of the recorded message when conductive foil 40 closes a circuit to ground 124 for shunting the holding current of the relay 109, whereupon it releases. The reset timer again begin to measure the time period required before the next announcement. Contacts 118 open to deenergize the tape transport motor 123. Contacts 117 close to reenergize the radio 122. Capacitor 125 suppresses arcing at contacts 117, 118.

For manual override, push button contacts 126 close a circuit through the resistor 127 to fire the UJT 104 and thereby start the commercial independently of timer 76. Push button contacts 128 shunt relay 109 to shunt off the commercial.

The voice amplifier 75 has two heads **38*a*, 38*b* for reproducing signals on two or more tracks, depending upon whether they are or are not movable. When the contacts 39 (FIG. 3) are used as part of the tape interlock, the circuit leading to these heads 38*a*, 38*b* may be enabled via the conductive strip 40. In any event, the heads 38*a*, 38*b* are connected to two preamplifiers 131, 132. The output of either one of the two preamplifiers 131, 132 is fed through a volume control potentiometer 133 to a speaker power amplifier 134. Potentiometer 133 is adjusted to the sound level requirements of the sales area. Resistors and capacitor 135 form a T-pad for lowering input voltage and for bypassing noise to ground. They also limit high frequency input levels to give a flat and more linear output signal. FIG. 6 shows a control terminal taken from the lower side of the triangle indicating amplifier 132. The signal taken from this terminal may act as an electrical interlock for controlling the system responsive to signals recorded on tape as at 63 and 65 in FIG. 5.**

Diode 136 and capacitor 137 prevent transients which might otherwise cause the amplifier 134 to go into low frequency self-sustained oscillation (i.e., the so-called "motorboating" effect). The diode 136 also protects the circuit if someone inadvertently connects the leads in a reverse-to-normal polarity.

Capacitor 141 is part of a noise filter. The resistor-capacitor combination 142 suppresses parasitic oscillation and transient spikes. Capacitor 143 provides a. c. coupling and d. c. isolation between speaker 78 and its amplifier 134. Multiple speakers may be connected via a jack 144.

The operation of the circuit should now be apparent. A source of background programs, such as a FM Stereo radio 122, is plugged into power supply jack 79, and the power supply 77 is plugged into a commercial power source S1. Any suitable interlocking contacts are closed as at conductive foil 40 or at contacts 74. The radio 122 begins to play and capacitor 84 begins to charge.

After capacitor 84 charges sufficiently in fifteen to forty-five minutes, relay 109 operates to open contacts 117 for deenergizing the ratio 122 and closes constact 118 for energizing the motor 123. Responsive to the energization of the motor 123, the recorded message is played back over speaker 78. At the end of the message, tape 40 supplies ground 124 to shunt the relay 109. When the relay releases, power is removed from motor 123 to stop the tape player and reapplied to the radio 122 to restore the background program.

Various modifications may readily occur to those who are skilled in the art. Therefore, the appended claims should be construed to cover all equivalent structures falling within the scope and spirit of the invention.

I claim:

1. Commercial announcement playback apparatus comprising means for providing a source of background program material, means for providing a source of commercial announcements, timer means for measuring predetermined periods of time, means responsive to said timer for interrupting said background program source, means for initiating operation of said commercial source means, and interlock means for precluding playback of a non-authorized commercial announcement.

2. The apparatus of claim 1 wherein said interlock means comprises mechanical interference means for precluding non-authorized operation of said commercial source means.

3. The apparatus of claim 2 wherein said commercial source means comprises a magnetic tape housed in a cassette or cartridge and said mechanical interference means comprises means for precluding insertion of an unauthorized cassette or cartridge in a tape player.

4. The apparatus of claim 3 and electrical interlocking means for precluding the operation of said source of commercial announcements.

5. The apparatus of claim 4 wherein said electrical interlock means makes contact with said magnetic tape.

6. The apparatus of claim 4 wherein said electrical interlock means operates responsive to signals recorded on said tape.

7. The apparatus of claim 4 wherein said electrical interlock means comprises contacts closed by said cassette or cartridge when in playing position in said apparatus.

8. The apparatus of claim 3 wherein said mechanical interference means comprises complimentary key-like means on said cassette or cartridge and said apparatus whereby said cassette or cartridge cannot be played back if said complimentary key-like means do not interfit.

9. The apparatus of claim 1 wherein said interlock means comprises electrical interlocking means for precluding the operation of said source of commercial announcements.

10. The apparatus of claim 9 wherein said electrical interlock means makes contact with said magnetic tape.

11. The apparatus of claim 9 wherein said electrical interlock means operates responsive to signals recorded on said tape.

12. A method of giving point of sale verbal announcements comprising the steps of a. prerecording advertising announcements adapted to a product or service available at a point of sale, b. positioning recording play back apparatus at the point of sale with amplification means therein for covering the sales area with the recorded announcement during said play back, c. normally precluding playback of unauthorized prerecorded advertising announcements, d. repeatedly measuring a selected predetermined period of time, e. starting said apparatus at the end of each period of time to interrupt any background programming and play back said recorded message, and f. stopping said apparatus and remeasuring said selected time period responsive to the end of said message.

13. The method of claim 12 and the added step of f. providing background programs during the measured periods of time.

14. The method of claim 13 and the added step of g. overriding said timer to immediately play back said recorded message.

15. The method of claim 14 and the added step of h. overriding said apparatus to immediately terminate said playback of said recorded message and reset said timer.

16 The method of claim 12 wherein the predetermined period of time is fixed after it has been selected.

17. The method of claim 12 wherein the predetermined period of time is variable after it has been selected.

* * * * *

UNITED STATES PATENT OFFICE
CERTIFICATE OF CORRECTION

Patent No. 3,825,947 Dated July 23, 1974

Inventor(s) JEROME RUBIN and AVERY LOCKNER

It is certified that error appears in the above-identified patent and that said Letters Patent are hereby corrected as shown below:

Column 3, line 5: before "31" "rnages" should be --ranges--

Column 5, line 60: before "off" "shunt" should be --shut--

IN THE CLAIMS:

Column 8, line 18: before "providing" "f." should be --g.--

Column 8, line 22: before "overriding" "g." should be --h.--

Column 8, line 25: before "overriding" "h." should be --i.--

Signed and sealed this 28th day of January 1975.

(SEAL)
Attest:

McCOY M. GIBSON JR.
Attesting Officer

C. MARSHALL DANN
Commissioner of Patents